United States Patent
Paul et al.

(10) Patent No.: US 12,019,775 B2
(45) Date of Patent: Jun. 25, 2024

(54) MANAGING PERMISSIONS FOR COLLABORATIVE SHARED DOCUMENTS

(71) Applicant: Salesforce, Inc., San Francisco, CA (US)

(72) Inventors: Sohom Paul, Sugar Land, TX (US); Manju Vijayakumar, Fremont, CA (US); Chaitanya Ravula, San Francisco, CA (US); Michael Brevoort, Littleton, CO (US); Andrew Fong, Menlo Park, CA (US)

(73) Assignee: Salesforce, Inc., San Francisco, CA (US)

(*) Notice: Subject to any disclaimer, the term of this patent is extended or adjusted under 35 U.S.C. 154(b) by 0 days.

(21) Appl. No.: 17/589,692

(22) Filed: Jan. 31, 2022

(65) Prior Publication Data
US 2023/0244802 A1  Aug. 3, 2023

(51) Int. Cl.
*G06F 15/16* (2006.01)
*G06F 16/176* (2019.01)
*G06F 21/62* (2013.01)
*H04N 1/44* (2006.01)

(52) U.S. Cl.
CPC ........ *G06F 21/6218* (2013.01); *G06F 16/176* (2019.01); *H04N 1/444* (2013.01)

(58) Field of Classification Search
CPC .... G06F 21/6218; G06F 16/176; H04N 1/444
See application file for complete search history.

(56) References Cited

U.S. PATENT DOCUMENTS

| | | | |
|---|---|---|---|
| 6,008,804 A | 12/1999 | Pommier et al. | |
| 7,913,178 B2 | 3/2011 | Gould et al. | |
| 8,924,844 B2 | 12/2014 | Lynch | |
| 10,848,445 B1 | 11/2020 | Willmann | |
| 11,256,387 B1 | 2/2022 | Huff et al. | |
| 11,301,200 B2 | 4/2022 | Zhang et al. | |
| 11,374,990 B2 | 6/2022 | Lansing et al. | |
| 2004/0267871 A1* | 12/2004 | Pratley | G06Q 10/10 |
| | | | 709/200 |
| 2005/0132281 A1 | 6/2005 | Pan et al. | |
| 2005/0193325 A1 | 9/2005 | Epstein | |

(Continued)

OTHER PUBLICATIONS

Hu et al. Attribute Considerations for Access Control Systems. NIST Special Publication 800-205, US Department of Commerce. Jun. 2019, pp. 1-42. (Year: 2019).*

(Continued)

*Primary Examiner* — Alex Gofman
*Assistant Examiner* — Shelly X Qian
(74) *Attorney, Agent, or Firm* — Lee & Hayes, P.C.

(57) ABSTRACT

Media, methods, and systems are disclosed for managing permissions for a collaborative document within a group-based communication system. A collaborative document may be created within a group-based communication system. When the collaborative document is created, permissions may be automatically assigned based on the context of collaborative document creation, such as which virtual space the collaborative document creation corresponds to. After creation, the collaborative document may be shared and permissions may be automatically updated based on the sharing context. Users without appropriate permissions will be prevented from accessing the document.

20 Claims, 8 Drawing Sheets

(56) References Cited

U.S. PATENT DOCUMENTS

| | | | |
|---|---|---|---|
| 2007/0016613 | A1* | 1/2007 | Foresti .................. G06Q 10/107 |
| 2008/0183819 | A1 | 7/2008 | Gould et al. |
| 2008/0229185 | A1 | 9/2008 | Lynch |
| 2009/0157811 | A1 | 6/2009 | Bailor et al. |
| 2009/0271696 | A1 | 10/2009 | Bailor et al. |
| 2013/0080919 | A1* | 3/2013 | Kiang .................. H04L 67/327 715/753 |
| 2013/0174032 | A1 | 7/2013 | Tse et al. |
| 2014/0258972 | A1 | 9/2014 | Savage et al. |
| 2016/0315995 | A1 | 10/2016 | Hausler et al. |
| 2017/0063749 | A1 | 3/2017 | Gupta et al. |
| 2017/0132200 | A1 | 5/2017 | Noland et al. |
| 2018/0157390 | A1 | 6/2018 | Vas et al. |
| 2018/0287982 | A1 | 10/2018 | Draeger et al. |
| 2018/0321889 | A1* | 11/2018 | Harris .................. G06Q 10/101 |
| 2019/0058680 | A1 | 2/2019 | Rosania et al. |
| 2019/0098087 | A1 | 3/2019 | Johnston et al. |
| 2019/0102472 | A1 | 4/2019 | Van Rensburg et al. |
| 2019/0108241 | A1 | 4/2019 | Emerick et al. |
| 2019/0166330 | A1 | 5/2019 | Ma et al. |
| 2019/0179876 | A1 | 6/2019 | Zhang et al. |
| 2019/0253430 | A1 | 8/2019 | Gamache et al. |
| 2019/0325213 | A1 | 10/2019 | Numata |
| 2020/0090135 | A1 | 3/2020 | Malcangio et al. |
| 2020/0279070 | A1 | 9/2020 | Rose et al. |
| 2020/0348802 | A1 | 11/2020 | Brito et al. |
| 2020/0387567 | A1 | 12/2020 | Loforte et al. |
| 2021/0150480 | A1 | 5/2021 | Haramati et al. |
| 2021/0248556 | A1 | 8/2021 | Venkatraman et al. |
| 2021/0397402 | A1 | 12/2021 | Ashkenazi et al. |
| 2022/0078143 | A1 | 3/2022 | Eirinberg et al. |
| 2022/0086200 | A1 | 3/2022 | Lansing et al. |
| 2022/0222625 | A1 | 7/2022 | Haramati et al. |
| 2022/0365740 | A1 | 11/2022 | Chang et al. |

OTHER PUBLICATIONS

Malik et al. A Comparison of Collaborative Access Control Models. IJACSA 8:3, 2017, pp. 290-296. (Year: 2017).*

Bertino et al. Specifying and enforcing access control policies for XML document sources. World Wide Web 3 (2000), pp. 139-151. (Year: 2000).*

Trevor et al. AnySpot: Pervasive Document Access and Sharing. IEEE Pervasive Computing 6(3), 2007, pp. 76-84. (Year: 2007).*

"Die, Email, Die! A Flickr Cofounder Aims To Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013) 2 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html> (dated May 28, 2014) 8 pages.

Ernie Smith, "Picking Up The Slack", TEDIUM, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, WIKIPEDIA, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014) 4 pages.

Matsumoto, T. et al., "Chocoa Communicator—A New Communication System Based on Awareness and Text Communications—", FUJITSU Sci. Tech. J., 36, 2, (Dec. 2000) 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516> (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

U.S. Appl. No. 17/564,506, Non-Final Office Action dated Oct. 6, 2022.

U.S. Appl. No. 17/564,506, Final Office Action dated Feb. 3, 2023.

U.S. Appl. No. 17/589,584, Non-Final Office Action dated Jan. 20, 2023.

PCT Patent Application PCT/US2022/052680 International Search Report and Written Opinion of the International Search Report, dated Apr. 5, 2023.

U.S. Appl. No. 17/589,822, Final Office Action dated Mar. 23, 2023.

U.S. Appl. No. 17/566,947, Non-final Office Action dated Apr. 24, 2023.

U.S. Appl. No. 17/589,822, Non-Final Office Action dated Nov. 30, 2022.

U.S. Appl. No. 17/564,506, Notice of Allowance dated Jun. 5, 2023.

U.S. Appl. No. 17/589,584, Notice of Allowance dated May 18, 2023.

* cited by examiner

… (US 12,019,775 B2)

MANAGING PERMISSIONS FOR COLLABORATIVE SHARED DOCUMENTS

TECHNICAL FIELD

Embodiments of the invention relate to determining permissions for collaborative documents within a group-based communication system. More specifically, certain embodiments of the invention relate to automatically determining permissions for collaborative documents within a group-based communication system based in part on how the collaborative documents are created and shared within the group-based communication system.

Documents typically require users to work asynchronously and permit only one user at a time to work on a document. These documents are often shared via third-party systems such as email, requiring a first user to save a version of a document, attach the document to an email, and then send the document to a second user. The second user will then have to download the document and open the document in the appropriate program. These extra steps create inefficiencies, waste the time of the users, and add version control issues which can increase the likelihood of mistakes.

SUMMARY

Embodiments of the invention address the above-identified problems by providing a context-specific automated permissions system for collaborative documents within a group-based communication system which determines permissions for collaborative documents based on the context in which the collaborative documents are created and shared. Collaborative documents created within a virtual space may automatically grant permissions to other users within the virtual space. Users that do not have access to the virtual space (e.g., an organization that does not have access) may not be granted permissions by default, and may be unable to view, search for, or preview such collaborative documents. Permissions may also be automatically determined when collaborative documents are shared within the group-based communication system based on the context in which messages which mention collaborative documents are sent. This creates a powerful collaboration tool which allows users and organizations to spend more time collaborating and working with collaborative documents and less time managing permissions, while still providing the necessary security.

In some aspects, the techniques described herein relate to one or more non-transitory computer-readable media storing computer-executable instructions that, when executed by a processor, perform a method for managing permissions for a collaborative document within a group-based communication system, the method including: receiving a creation request to create the collaborative document associated with a group-based communication system user and a first context in the group-based communication system, wherein the first context is associated with a first virtual space and a corresponding first set of users associated with the first virtual space, the first set of users including the group-based communication system user; in response to creating the collaborative document, creating a set of collaborative document permissions for the corresponding first set of users associated with the first virtual space; and updating the set of collaborative document permissions based on a second context distinct from the first context, wherein the second context is associated with a second virtual space including a second set of users who can access the collaborative document.

In some aspects, the techniques described herein relate to one or more non-transitory computer-readable media storing computer-executable instructions that, when executed by a processor, perform a method for managing permissions for a collaborative document within a group-based communication system including: receiving a creation request to create the collaborative document associated with a first user and a first context in the group-based communication system, wherein the first context is associated with a first virtual space and a corresponding first set of users associated with the first virtual space, the corresponding first set of users including the first user; in response to creating the collaborative document, creating a set of collaborative document permissions for the corresponding first set of users associated with the first virtual space; determining a second context distinct from the first context based on an event associated with the collaborative document; and updating the set of collaborative document permissions based on the second context, wherein the second context is associated with a corresponding second set of users who can access the collaborative document.

In some aspects, the techniques described herein relate to a non-transitory computer-readable media, wherein the event associated with the collaborative document causes the collaborative document to be associated with a second virtual space associated with the second context and the corresponding second set of users is associated with the second virtual space and is different from the corresponding first set of users associated with the first virtual space.

In some aspects, the techniques described herein relate to a non-transitory computer-readable media, wherein the first context is associated with an ephemeral communication session and the second context is associated with a persisted communication session.

In some aspects, the techniques described herein relate to a non-transitory computer-readable media, wherein the first virtual space is one of a channel, a workspace, an ephemeral multimedia collaboration session, a direct message, or a multi-person direct message.

In some aspects, the techniques described herein relate to a non-transitory computer-readable media, wherein the event includes receiving a message request to send a message in a second virtual space of the group-based communication system, wherein the message contains a first mention of the collaborative document and a second mention of a second user, wherein the second user is not in the corresponding second set of users with permission to access the collaborative document, and the method further includes: in response to receiving the first mention and the second mention, updating the set of collaborative document permissions to add the second user to the corresponding second set of users.

In some aspects, the techniques described herein relate to a non-transitory computer-readable media, wherein the event includes receiving a mention request to associate a second user with the collaborative document, wherein the second user is not in the corresponding second set of users with permission to access the collaborative document, and wherein method further includes: in response to receiving the mention request, updating the set of collaborative document permissions to add the second user to the corresponding second set of users.

In some aspects, the techniques described herein relate to a non-transitory computer-readable media, wherein the event includes receiving a comment to the collaborative document from a second user in a message in a second virtual space, wherein the second virtual space is different from the first virtual space and wherein the second user is not in the corresponding second set of users with permission to access the collaborative document, and the method further includes: in response to receiving the comment in the second virtual space, updating the set of collaborative document permissions to add the second user to the corresponding second set of users.

In some aspects, the techniques described herein relate to a method for managing permissions for a collaborative document within a group-based communication system, the method including: receiving a creation request to create the collaborative document associated with a first user and a first context in the group-based communication system, wherein the first context is associated with a first virtual space and a corresponding first set of users associated with the first virtual space, the corresponding first set of users including the first user; in response to creating the collaborative document, creating a set of collaborative document permissions for the corresponding first set of users associated with the first virtual space; determining a second context distinct from the first context based on an event associated with the collaborative document; and updating the set of collaborative document permissions based on the second context, wherein the second context is associated with a corresponding second set of users who can access the collaborative document.

In some aspects, the techniques described herein relate to a method, wherein the event associated with the collaborative document causes the collaborative document to be associated with a second virtual space associated with the second context and the corresponding second set of users is associated with the second virtual space and is different from the corresponding first set of users associated with the first virtual space.

In some aspects, the techniques described herein relate to a method, wherein the first context is associated with an ephemeral communication session and the second context is associated with a persisted communication session.

In some aspects, the techniques described herein relate to a method, wherein the first virtual space is one of a channel, a workspace, an ephemeral multimedia collaboration session, a direct message, or a multi-person direct message:

In some aspects, the techniques described herein relate to a method, wherein the event includes receiving a message request to send a message in a second virtual space of the group-based communication system, wherein the message contains a first mention of the collaborative document and a second mention of a second user, wherein the second user is not in the corresponding second set of users with permission to access the collaborative document, and the method further includes: in response to receiving the first mention and the second mention, updating the set of collaborative document permissions to add the second user to the corresponding second set of users.

In some aspects, the techniques described herein relate to a method, wherein the event includes receiving a mention request to associate a second user with the collaborative document, wherein the second user is not in the corresponding second set of users with permission to access the collaborative document, and the method further includes: in response to receiving the mention request, updating the set of collaborative document permissions to add the second user to the corresponding second set of users.

In some aspects, the techniques described herein relate to a method, wherein the event includes receiving a comment to the collaborative document from a second user in a message in a second virtual space, wherein the second virtual space is different from the first virtual space and wherein the second user is not in the corresponding second set of users with permission to access the collaborative document, and the method further includes: in response to receiving the comment in the second virtual space, updating the set of collaborative document permissions to add the second user to the corresponding second set of users.

In some aspects, the techniques described herein relate to a system including at least one processor and at least one non-transitory memory storing computer executable instructions that when executed by the processor cause the system to carry out actions for managing permissions for a collaborative document within a group-based communication system including: receiving a creation request to create the collaborative document associated with a first user and a first context in the group-based communication system, wherein the first context is associated with a first virtual space and a corresponding first set of users associated with the first virtual space, the corresponding first set of users including the first user; in response to creating the collaborative document, creating a set of collaborative document permissions for the corresponding first set of users associated with the first virtual space; determining a second context distinct from the first context based on an event associated with the collaborative document; and updating the set of collaborative document permissions based on the second context, wherein the second context is associated with a corresponding second set of users who can access the collaborative document.

In some aspects, the techniques described herein relate to a system, wherein the event associated with the collaborative document causes the collaborative document to be associated with a second virtual space associated with the second context and the corresponding second set of users is associated with the second virtual space and is different from the corresponding first set of users associated with the first virtual space.

In some aspects, the techniques described herein relate to a system, wherein the first context is associated with an ephemeral communication session and the second context is associated with a persisted communication session.

In some aspects, the techniques described herein relate to a system, wherein the first virtual space is one of a channel, a workspace, an ephemeral multimedia collaboration session, a direct message, or a multi-person direct message.

In some aspects, the techniques described herein relate to a system, wherein the event includes receiving a message request to send a message in a second virtual space of the group-based communication system, wherein the message contains a first mention of the collaborative document and a second mention of a second user, wherein the second user is not in the corresponding second set of users with permission to access the collaborative document, and wherein the actions further include: in response to receiving the first mention and the second mention, updating the set of collaborative document permissions to add the second user to the corresponding second set of users.

In some aspects, the techniques described herein relate to a system, wherein the event includes receiving a mention request to associate a second user with the collaborative document, wherein the second user is not in the corresponding second set of users with permission to access the collaborative document, and wherein the actions further include: in response to receiving the mention request, updating the set of collaborative document permissions to add the second user to the corresponding second set of users.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1A:
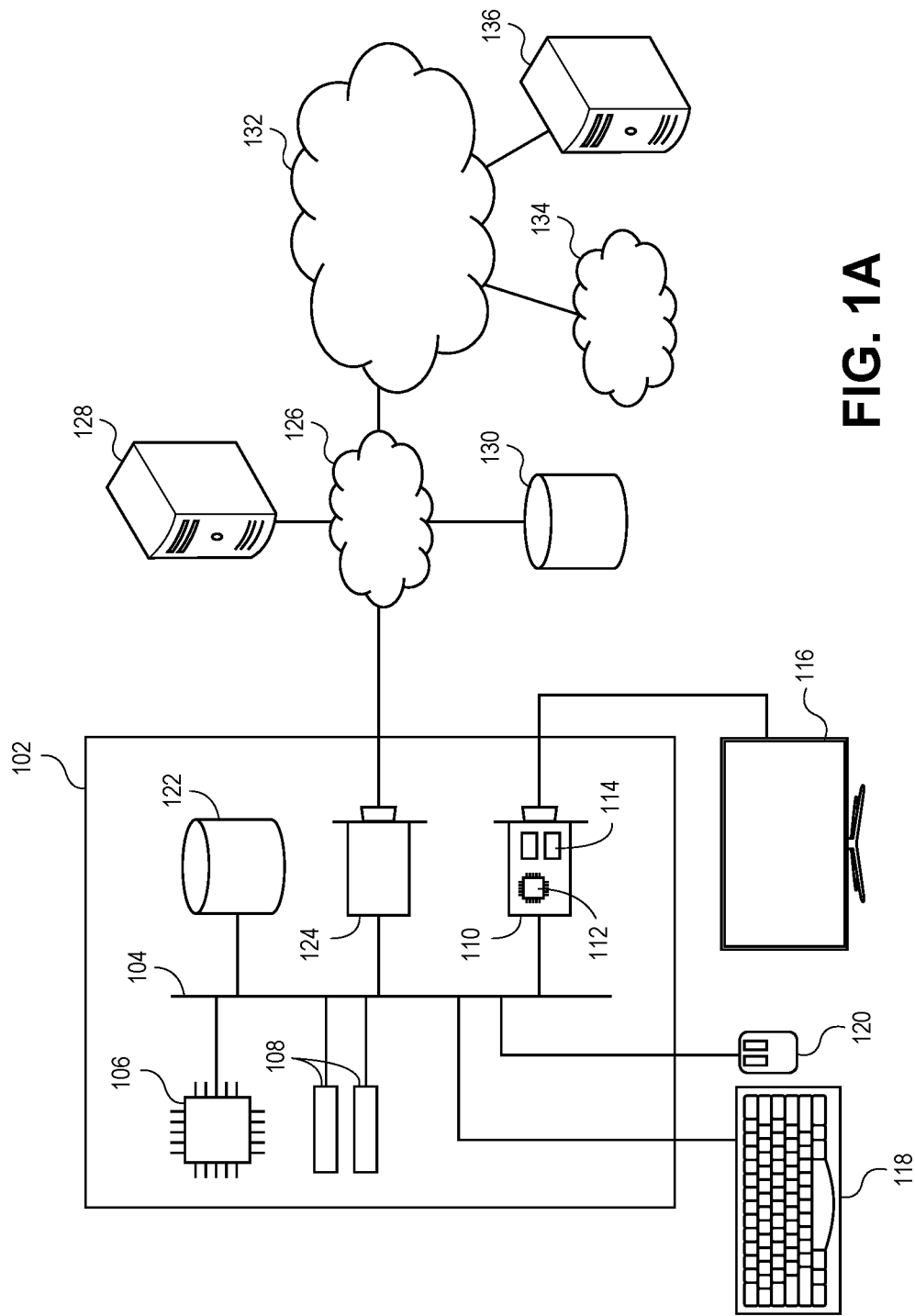
FIG. 1A depicts an exemplary hardware platform relating to certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Context and Concepts of the Invention

As used herein, the term "group-based communication system" refers to a collaborative communication system used within an organization and is distinct from a conventional email system. In some embodiments, the group-based communication system is a channel-based platform. Within the group-based communication system, communication may be organized into "channels," each dedicated to a particular topic or set of users. Channels are generally long-lasting, persistent discussions of a particular topic. Members of a particular channel can post messages within that channel that are visible to other members of that channel together with other messages in that channel. Users may select a channel for viewing in order to see only those messages relevant to the topic of that channel without seeing messages posted in other channels on different topics. For example, a software development company may have different channels for each software product being developed, where developers working on each particular project can converse without bothering (or being bothered by) developers working on other projects. Because the channels are generally persistent and directed to a particular topic or group, users can quickly and easily refer back to previous communications for reference. Channels may be public such that anyone from within an organization can find the channel via search, join the channel, read posts in the channel, and contribute to the channel. Channels may also be private and invisible to all users who have not been explicitly added to the channel. In some embodiments, new users may be added to private channel's only by invitation from an existing member of the channel. Channels may also be shared across organizations so that multiple separate companies can collaborate together. In some such embodiments, channels may have members from both participant organizations, and may be managed by a hosting organization of the two organizations.

In some embodiments, the group-based communication system may include synchronous multimedia collaboration sessions. Synchronous multimedia collaboration sessions may provide ambient, ad hoc multimedia collaboration in the group-based communication system. Users of the group-based communication system can quickly and easily join and leave these synchronous multimedia collaboration sessions at any time, without disrupting the synchronous multimedia collaboration session for other users. In some embodiments, synchronous multimedia collaboration sessions may be based around a particular topic, a particular channel, or a set of users, while in other embodiments, synchronous multimedia collaboration sessions may exist without being tied to any particular channel, topic or set of users. Synchronous multimedia collaboration sessions may be short, ephemeral sessions from which no data is persisted. Alternatively, in some embodiments, synchronous multimedia collaboration sessions may be recorded, transcribed, and/or summarized for later review. Members of a particular synchronous multimedia collaboration session can post messages within a messaging thread associated with that synchronous multimedia collaboration session that are visible to other members of that synchronous multimedia collaboration session together with other messages in that thread. The "multimedia" in a synchronous multimedia collaboration session may include any or all of audio, video, screen sharing, collaborative document editing, whiteboarding, co-programming or any other form of media. As discussed below, collaborative working may allow multiple users, applications, and integrations to edit a shared canvas, which may persist after the collaboration session. In such embodiments, permissions may be managed by the group-based communication system based on the context in which the shared canvas is created, accessed and/or shared. A synchronous multimedia collaboration session may be started for a particular channel or direct message conversation by one or more members of that channel or direct message conversation. For example, a user may start a synchronous multimedia collaboration session in a channel as a means of communicating with other members of that channel who are presently online. The user may have an urgent decision and want immediate verbal feedback from other members of the channel. Starting a synchronous multimedia collaboration session allows the user to start an immediate audio conversation with other members of the channel without requiring scheduling. Upon starting a synchronous multimedia collaboration session, other members of the channel may receive a notification alerting them that the synchronous multimedia collaboration session has begun. That notification may be a direct message, an alert, or an icon corresponding to the channel in which the synchronous multimedia collaboration session was initiated. A list of all active synchronous multimedia collaboration sessions may be provided to the users.

Communication data within a group-based communication system may include messages, queries, files (e.g., documents, spreadsheets, computer code, images, video, audio, and/or electronic contact information), mentions, users or user profiles, interactions (e.g., reactions, edits, deletions, and/or prioritizations such as by pinning or starring), tickets, channels, applications integrated into one or more channels, conversations (e.g., groups of messages that have been segmented as single units), workspaces (e.g., sets of channels, users, projects, tasks within an organization that may have their own sets of permissions and that may be organized substantially in line with an organization chart in some instances) or other data generated by or shared between users of the group-based communication system that are associated with an organization's communication data using the group-based communication system.

In some instances, the communication data may comprise data associated with a user (e.g., a user profile), including, but not limited to, a user identifier, one or more communication channel identifiers associated with communication channels to which the user has been granted access, one or more group identifiers for groups (or organizations, teams, entities, or the like) with which the user is associated, an indication of whether the user is an owner or manager of any communication channels, an indication of whether the user has any communication channel restrictions, a plurality of messages, a plurality of emoji, a plurality of conversations, a plurality of conversation topics, an avatar, an email address, a real name (e.g., Austin Author), a username (e.g., austin_a), a password, user preferences and/or settings, a time zone, a status, a token, and other user-specific information. In some embodiments, the group-based communication system may additionally or alternatively store permissions data associated with permissions of individual users of the group-based communication system. In some embodiments, permissions associated with an individual user can be mapped to, or otherwise associated with, an account or profile associated with user data. Permissions can indicate which users can communicate directly with other users, which channels a user is permitted to access, restrictions on individual channels, which workspaces the user is permitted to access, and restrictions on individual workspaces, for example. In some embodiments, the permissions can support the group-based communication system by maintaining security for limiting access to a defined group of users. In some such embodiments, such users can be defined by common access credentials, group identifiers, or other criteria, as described above.

In some embodiments, the group-based communication system can be partitioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. A workspace may comprise one or more channels that are unique to that workspace and/or one or more channels that are shared between one or more workspaces. In some embodiments, workspaces can be associated with one or more organization identifiers, which can be associated with organizations or other entities associated with the group-based communication system. In some embodiments, such data can be mapped to, or otherwise associated with, other types of data (e.g., user data, permission data, or channel data).

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments of the Invention

FIG. 1A illustrates an exemplary hardware platform for certain embodiments of the invention. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple buses, or components may communicate with each other directly. System bus 104 is connected to central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system bus 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media, and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, BLUETOOTH, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functionality for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 1B:
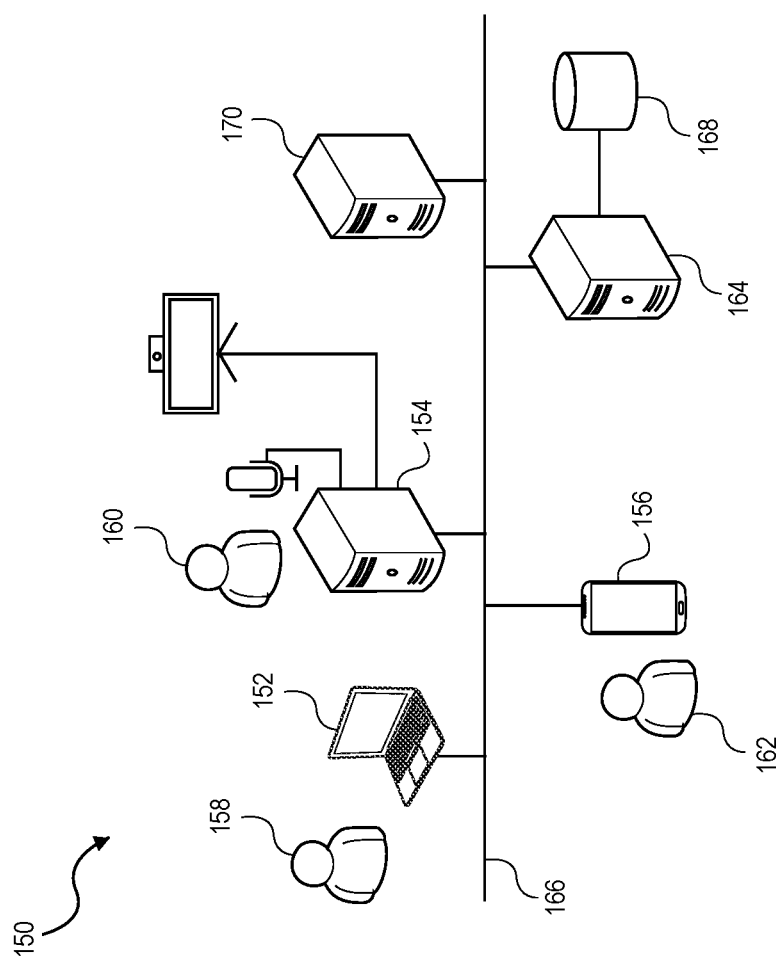
FIG. 1B depicts a system figure including elements for carrying out certain embodiments of the invention.

FIG. 1B illustrates elements of a system 150 for carrying out embodiments of the invention. System 150 includes any number of client devices such as client device 152, client device 154, and client device 156 associated with user 158, user 160, and user 162 respectively. Although system 150 is depicted with one client device per user, an individual user may connect to the group-based communication system using multiple client devices, either concurrently or sequentially. Similarly, in some embodiments, multiple users may share (concurrently or sequentially) a single client device to access the group-based communication system. As depicted in FIG. 1B, client devices may be any form of computing device discussed above with respect to FIG. 1A. In particular, a user may access the group-based communication system using a desktop, a laptop, or a mobile device. The group-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 152). In some embodiments, the group-based communication system is a channel-based messaging platform.

The group-based communication system is hosted by group-based communication system server 164. Group-based communication system server 164 may be a dedicated server, a shared server, a virtual machine instance in a cloud computing environment, or any other form of computing device discussed above with respect to FIG. 1A. Although a single group-based communication system server 164 is depicted, embodiments with multiple such group-based communication system servers are also contemplated so as to provide scale, redundancy and/or isolation between different instances of the group-based communication system. For example, a software development company may not wish to have its group-based communications system hosted on the same server as a competitor's group-based communication system for security reasons. Group-based communication system server 164 is communicatively coupled to client devices 152, 154, and 156 via network 166. Network 166 may be a local area network (LAN), wide-area network (WAN), virtual private network (VPN) or the Internet. Broadly speaking, any type of network for providing communication between the various components of system 150 is contemplated. Group-based communication system server 164 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client application are also contemplated.

Group-based communication system data store 168 is communicatively connected to group-based communication system server 164. As depicted, group-based communication system data store 168 is directly connected to group-based communication system server 164; however, any form of communicative connection (for example, network-attached storage (NAS), a network file system (NFS), or cloud-based storage) can be employed. Broadly speaking, group-based communication system data store 168 stores all of the durable information used by group-based communication system server 164. For example, group-based communication system data store 168 may store all of the messages with their associated channels, documents and images uploaded to particular channels, channel membership information, and/or user information. In some embodiments, collaboration sessions may be archived and stored on the group-based communication system data store 168 for subsequent retrieval. As previously discussed, multiple group-based communication system servers may be present in system 150. In such embodiments, each group-based communication system server may have its own copy of group-based communication system data store 168. Alternatively, multiple group-based communication system servers may share a single network-attached group-based communication system data store. Alternatively, or in addition, in any of these embodiments, data may be sharded across multiple group-based communication system data stores.

Real-time media server 170 is also communicatively coupled to group-based communication system server 164 and client devices 152, 154 and 156. Real-time media server manages the multimedia aspects of real-time multimedia collaboration sessions among users of the group-based communication system as described in additional detail below. The term "multimedia" is used in this specification for brevity; however, it should be understood that the term used herein contemplates audio-only streams, video-only streams, audio/video streams, or any other combination of one or more media streams.

As depicted, the communication between real-time media server 170 is via network 166. In some embodiments, however, the real-time nature of collaboration sessions may be better served by connecting via a different network for part or all of the communicative coupling. For example, a particular client device may normally connect to group-based communication system server 164 via a cellular data connection but switch to a Wi-Fi connection when a multimedia collaboration session begins to accommodate an additional demand for bandwidth. In some embodiments, client devices may communicate multimedia collaboration data with each other via real-time media server 170 using a hub-and-spoke configuration. In other embodiments, client devices may communicate with each other directly using a peer-to-peer or supernode architecture. In still other embodiments, client devices on the same network may communicate with each other using multicast network protocols such as IP multicast. In yet other embodiments, media communication between the client devices may be via an edge-based scaling content distribution network.

Figure 2A:
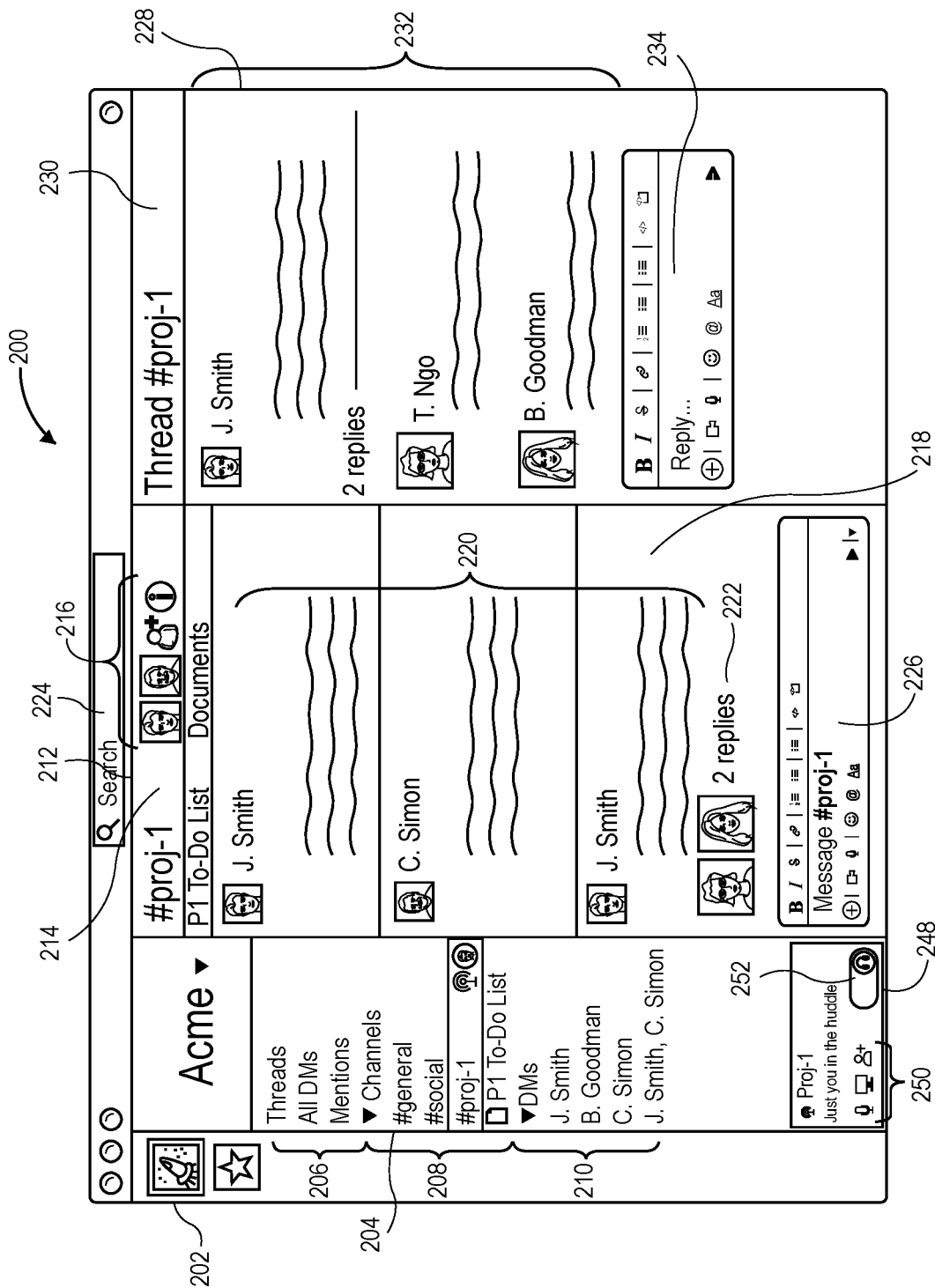
FIG. 2A illustrates a user interface for the group-based communication system for certain embodiments.

FIG. 2A illustrates a user interface 200 of a group-based communication system, which will be useful in illustrating the operation of various embodiments, as discussed in further detail below. Broadly, user interface 200 comprises a plurality of objects such as panes, text entry fields, buttons, messages, or other user interface components. As depicted, user interface 200 comprises workspace pane 202; channel list pane 204, which comprises quick info list 206, channel and document list 208 and direct message list 210; channel pane 212, which comprises channel header 214, channel controls 216, channel display 218, messages 220, and thread reply preview 222; search pane 224; compose pane 226; and thread pane 228.

As depicted, user interface 200 includes workspace pane 202 for navigating between various workspaces in the group-based communication system. In some embodiments, the group-based communication system can be portioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. For example, a user may be a part of a workspace for a job at Acme Software Engineering. The user may also be a member of a local volunteer organization that also uses the group-based communication system to collaborate. To navigate between the two groups, the user may use workspace pane 202 to change from the Acme workspace to the volunteer organization workspace. A workspace may comprise one or more channels that are unique to that workspace and/or one or more channels that are shared between one or more workspaces. For example, the Acme company may have a workspace for Acme Software Engineering projects, a workspace for Human Resources, and an additional workspace for general company matters. In some embodiments, workspaces can be associated with one or more organizations or other entities associated with the group-based communication system.

Users may navigate between channels using channel list pane 204. Channel list pane 204 may comprise quick info list 206 comprising various links for a user to quickly access portions of the group-based communication system. For example, as depicted, quick info list 206 comprises threads, Direct Messages (DMs), and mentions/reactions. Each of the items in quick info list 206 may be bolded, italicized, highlighted, boxed, animated, or otherwise called out to indicate the presence of unread items or items otherwise of interest. Clicking on the threads link in quick info list 206 may cause the display of all threads in which the user has participated, while clicking on the DMs list may cause the display in user interface 200 of all the direct messages in which the user is involved. Quick info list 206 may be configurable by the user to add various links to areas of the group-based communication system for quick access, such as a link to view all files shared within the group-based communication system. Channel list pane 204 may also comprise channel and document list 208 listing all channels and collaborative documents to which the user has subscribed to or to which the user has been granted access. In some embodiments, channel list pane 204 further includes direct message list 210. Direct message list 210 comprises a list of messages sent from a user directly to another user of the group-based communication system, which may be displayed in channel pane 212 when selected. Direct messages may be sent to one other user or to any number of users. In some embodiments, channel list pane 204 may include synchronous multimedia collaboration session pane 248. Synchronous multimedia collaboration session pane 248 may comprise synchronous multimedia collaboration session controls 250 and synchronous multimedia collaboration session toggle 252. In some embodiments, synchronous multimedia collaboration session pane 248 may display information on which users are participating in a synchronous multimedia collaboration session. Synchronous multimedia collaboration session controls 250 allow a user to mute or unmute, share a screen, and invite other users into the synchronous multimedia collaboration session. In some embodiments, a user selecting to mute during a synchronous multimedia collaboration session may provide the user with an option of providing background music. Users can leave or join a synchronous multimedia collaboration session by actuating synchronous multimedia collaboration session toggle 252. In some embodiments, the synchronous multimedia collaboration session will correspond to a channel or message that the user selected within channel list pane 204.

User interface 200 may further comprise channel pane 212 that displays information related to the currently displayed channel. In some embodiments, within the group-based communication system, communication may be organized into "channels," each channel dedicated to a particular topic or set of users. For example, Acme Software Engineering company utilizing the group-based communication system may have a channel #general to discuss general company matters and a #proj-1 channel to discuss a live project. Teams within the software engineering firm may have their own channels as well, such as a #devops channel for a DevOps team. Members of a particular channel can post messages within that channel that are visible to other members of that channel together with other messages in that channel. In some embodiments, or for certain selected channels, messages may be visible only to channel members; in other embodiments or for other channels, non-members of a channel may be able to preview messages in a channel without joining. Users may select a channel for viewing in order to see only those messages relevant to the topic of that channel without seeing messages posted in other channels on different topics.

Channel pane 212 may also include channel header 214, which may display metadata for the currently selected channel, including channel name, channel membership, and channel topic. Channel header 214 may also display channel controls 216 for viewing members of the channel, inviting a new member to the channel, viewing information about the channel, or other channel-related functions. User interface 200 may also include search pane 224. Search pane 224 may allow users to search for content located in the current workspace of the group-based communication system, such as files, messages, channels, members, commands, functions, and the like.

As previously mentioned, channel pane 212 may also include compose pane 226. Compose pane 226 allows users to compose and transmit messages to the members of the channel. Compose pane 226 may have text editing functions such as bold, strikethrough, and italicize. Compose pane 226 may also allow users to format their messages or attach files such as, but not limited to, collaborative documents, images, videos, or any other files to share the file or files with other members of the channel. Compose pane 226 may also permit users to mention collaborative documents to automatically share those collaborative documents.

In some embodiments, conversations in channels may further be broken out into threads. Threads may be used to aggregate messages related to a particular conversation together to make the conversation easier to follow and reply to. For example, a user, J. Smith, in the channel #proj-1 may ask a question pertaining to a specific company policy. Another member of the channel may decide to reply to J. Smith in a thread to keep the conversation grouped together and to keep the response from getting lost in the channel. Under the message to which a user has replied appears thread reply preview 222. Thread reply preview 222 may show information related to the thread, such as, for example, the number of replies and the members who have replied. Thread replies may appear in thread pane 228 that may be separate from channel display 218 in channel pane 212 and may be viewed by other members of the channel by selecting thread reply preview 222 in channel display 218.

In some embodiments, thread pane 228 comprises thread header 230 that may display the channel the thread is associated with. Thread pane 228 also may include scrollable thread display 232 that displays each message sent in the history of the thread. Users participating in the thread may also reply directly to the thread using thread compose pane 234. Thread compose pane 234 may be positioned within thread pane 228 where a user can compose and transmit a reply to the messages in the thread. In some embodiments, thread compose pane 234 shares the features of compose pane 226. In further embodiments, thread pane 228 may be used for comments within collaborative documents. For example, users who wish to add comments in a collaborative document may do so by selecting an icon from within the collaborative document to launch thread pane 228. Thread pane 228 may then permit the user to add comments within the document which will be displayed in thread pane 228. In some embodiments, individual sections within collaborative documents may have their own thread pane 228. In further embodiments, the icons within the collaborative document corresponding to sections may change based on if there are any comments associated with the section. In this way, sections of collaborative documents can be interacted with in any of the ways described herein with respect to group-based communication system messages.

Figure 2B:
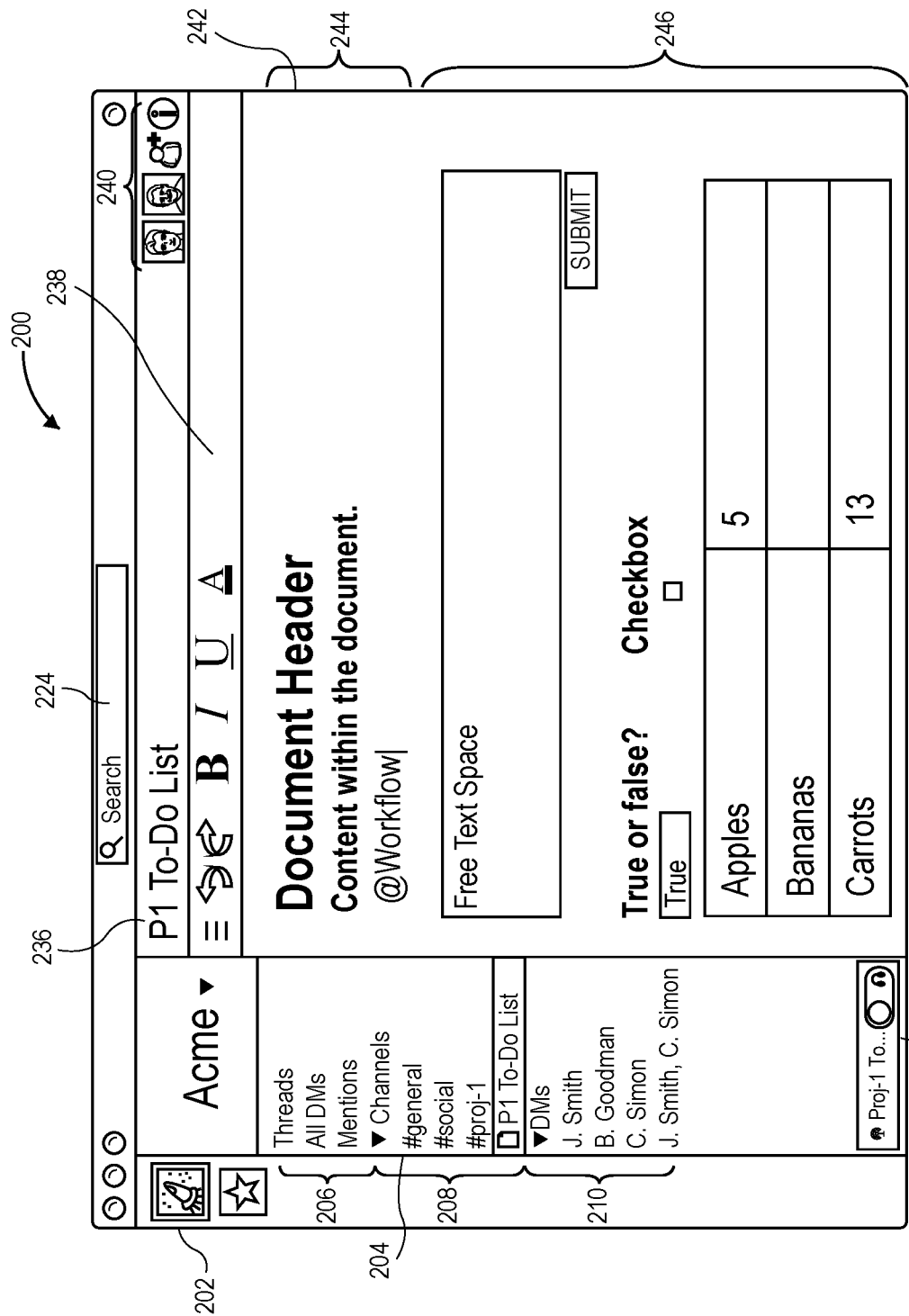
FIG. 2B depicts an exemplary embodiment of a user interface for the group-based communication system for displaying a collaborative document.

FIG. 2B, by contrast, illustrates user interface 200 when the user is displaying only a collaborative document instead of channel information. Where common features or elements are unchanged, they are not discussed separately from their description with respect to FIG. 2A. As illustrated, channel pane 212 and thread pane 228 have been replaced with document pane 236. In some embodiments, document pane 236 may be displayed alongside any other pane, such as channel pane 212. In some embodiments, within the group-based communication system, collaborative documents may be modified and edited by one or more users. Users with the appropriate permissions and access can view, edit, or comment on the collaborative documents. Document pane 236 may comprise document toolbar 238, document controls 240, and document display 242. Document display 242 may display all of the content within the collaborative document including unstructured sections 244 and structured sections 246. The functionality of document pane 236 may be provided by the group-based communication system or by a third-party integration. Although a collaborative document focused on word-processing is depicted in document pane 236, any type of collaborative document is contemplated for use with the invention, including spreadsheet editing, multimedia editing, image editing, and code editing. In some embodiments, collaborative documents may be text-based documents. In other embodiments, collaborative documents may include other document types, forms, and features. For example, documents may incorporate spreadsheet, database, and/or presentation functionality, including the use of programmatic functions that can interact with group-based communication system objects. Similarly, documents may integrate workflow features such that users can collaboratively complete a workflow by filling out sections of a document. In some embodiments, documents may be persisted via a group-based communication data system data store or via a group-based communication system data table. In some examples, some types of document-editing features may be provided by a different third-party integration. Users can switch the currently displayed collaborative document to either another collaborative document, a channel, or a direct message by selecting another item in channel list pane 204.

Document pane 236 may include document toolbar 238, which may display icons and menus which allow for the formatting of a collaborative document. For example, document toolbar 238 may provide a user the ability to bold, italicize, or underline fonts. In some embodiments, document toolbar 238 may provide users the ability to undo and redo actions. In further embodiments, document toolbar 238 may allow a user to modify the color of text. In still further embodiments, document toolbar 238 may allow a user to insert images, tables, and/or workflows. Document pane 236 may also display metadata for the currently selected collaborative document, including document name. Document pane 236 may also include document controls 240 for viewing members with access to the collaborative document, inviting a new member to access the collaborative document, viewing information about the collaborative document, or other document-related functions. For example, document controls 240 may display icons indicating which users are actively viewing the collaborative document. In some embodiments, document pane 236 may display a workflow status which indicates which workflow step the workflow is currently on. For example, a workflow status may show that the collaborative document is currently in the process of an approval workflow step and the collaborative document is awaiting approval from a specific user. In further embodiments, the workflow status may show a summary of information within the collaborative document. For example, the collaborative document may include a table for users to insert their shirt size, and the workflow status may include a summary of the number of shirts of each size that were entered into the table. As described elsewhere, users may interact with documents in any way they can interact with a group-based communication system message. For example, users may mention other users (for example, by adding their username preceded by a special tag such as "@") to notify them of content requiring their attention in a document. For example, a user may determine that input or feedback from another user is required in a document. By mentioning that user in the document, the second user may be notified and automatically granted permissions. Similarly, users can reference group-based communication system channels and other collaborative documents to share content with other users viewing or editing the collaborative document. In some embodiments, mentioning users, channels, or other collaborative documents from within a collaborative document may appropriately adjust the permissions for one or more channels or documents to allow users to interact with them seamlessly.

Document display 242 may display the selected collaborative document if the viewing user has sufficient permissions (e.g., a view permission). In some embodiments, a user of the group-based communication system may edit the collaborative document if they have sufficient permissions (e.g., an edit permission). In further embodiments, a user of the group-based communication system may leave comments on the collaborative document (e.g., a comment permission). As described below, permissions may be automatically assigned to collaborative documents based on, for example, the context of creation. In some embodiments, collaborative documents may comprise free-form unstructured sections 244 and workflow-related structured sections 246. In some such embodiments, sections may have individual permissions associated with them. In some embodiments, unstructured sections 244 may include areas of the collaborative document in which a user can freely modify the collaborative document without any constraints. For example, a user may be able to freely type text to explain the purpose of the collaborative document. In some embodiments, a user may add a workflow or a structured workflow section by typing the name of (or otherwise mentioning) the workflow. In further embodiments, typing the at sign or a previously selected symbol or a previously determined special character or symbol may provide the user with a list of workflows which the user can select to add to the collaborative document. For example, a user may realize that a marketing team may need to sign off on a proposal and type "!Marketing Approval" to initiate a workflow which culminates in a member of the marketing team approving the proposal. Users may also mention users or channels from within collaborative documents to automatically share the documents with those users or channels. In some embodiments, structured sections 246 may include text entry, selection menus, tables, checkboxes, tasks, calendar events, or any other document section. In further embodiments, structured sections may include text entry spaces which are a part of a workflow. For example, a user may enter text into a text entry space detailing a reason for approval, and then select a submit button which will advance the workflow to the next step of the workflow. In some embodiments, the user may be able to add, edit, or remove structured sections of the collaborative document that make up the workflow components.

Figure 3A:
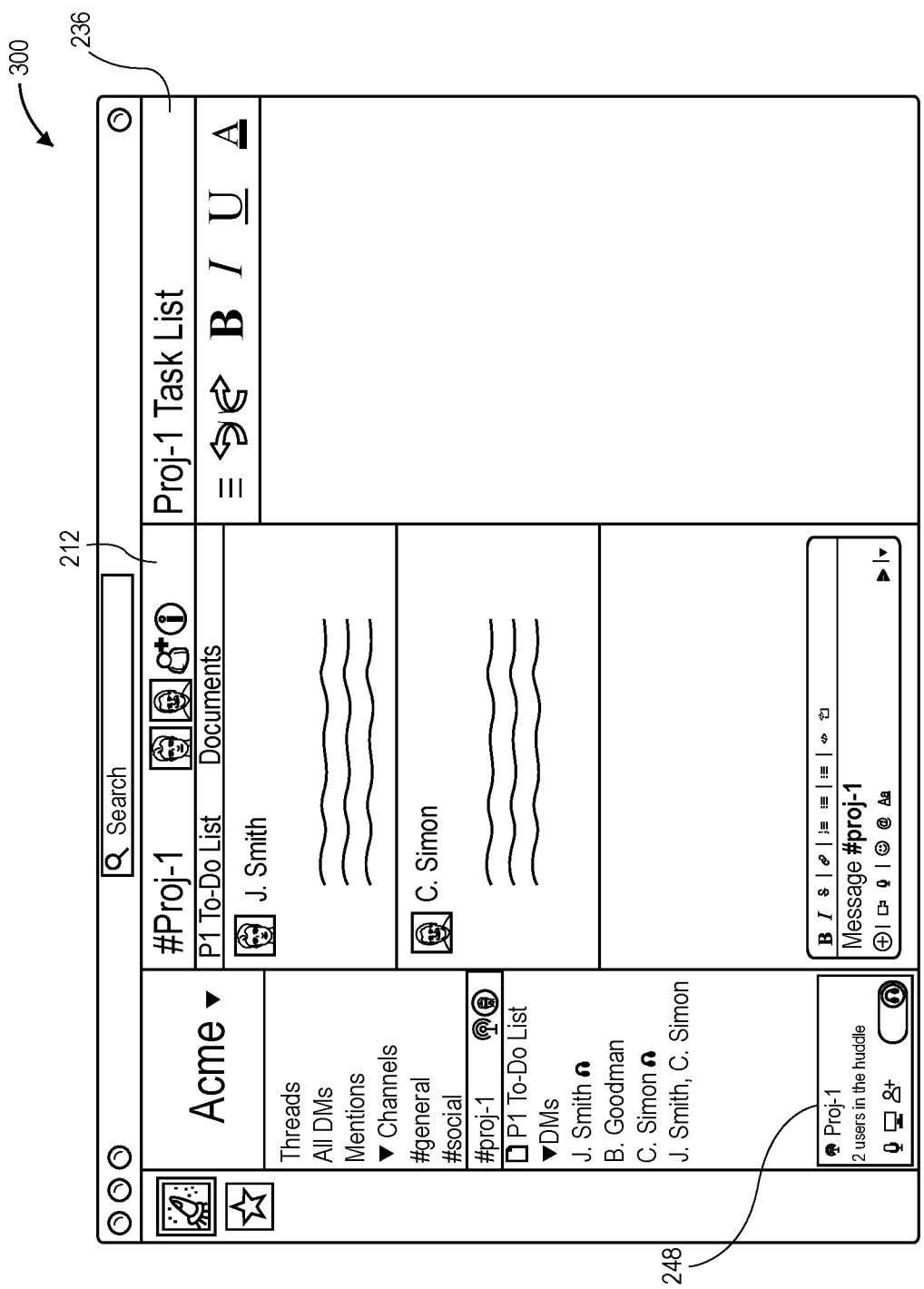
FIG. 3A depicts a user interface for creating a collaborative document during a synchronous multimedia collaboration session.

FIG. 3A depicts user interface 300, reflecting one exemplary scenario of creating a collaborative document during a synchronous multimedia collaboration session. As illustrated in FIG. 3A, a user has just created a collaborative document that is associated with the synchronous multimedia collaboration session. In some embodiments, the synchronous multimedia collaboration session is associated with a first virtual space, the channel illustrated in channel pane 212. In some embodiments, the synchronous multimedia collaboration session is not associated with the channel illustrated in channel pane 212. Channel pane 212 is depicted showing the contents of the virtual space, a channel, in which the synchronous multimedia collaboration session was started. Synchronous multimedia collaboration session pane 248 is depicted showing that the synchronous multimedia collaboration session is ongoing and that two users are currently participating in the active session. As described below, the two participating users are associated with the first context for the collaborative document and initially be granted permissions to access, edit, or perform other operations for the collaborative document. In some embodiments, all users participating in the synchronous multimedia collaboration session are automatically granted permissions to access the document. In other embodiments, all users within another virtual space associated with the synchronous multimedia collaboration session (for example, a group-based communication system channel, direct message, or multi-person direct message) may be granted appropriate permissions. Document pane 236 is depicted showing the collaborative document which was created. In some embodiments, the new collaborative document may be created using a template to auto-populate the new collaborative document with content. In other embodiments, the new collaborative document may be created blank. In some embodiments, upon document creation, a link to the collaborative document may be posted within channel pane 212 (or other associated virtual space) to allow other users to access the collaborative document. In some embodiments, users from within the synchronous multimedia collaboration session and/or users associated with the channel may receive a notification that a collaborative document link was posted. In some embodiments, only users associated with the active synchronous multimedia communication session may access the collaborative document. Users may select the collaborative document link to open the collaborative document, after which the users may actively collaborate (for example, by viewing and/or editing the document). In some embodiments, the collaborative document link may include a preview of the document. Thus, the exemplary scenario depicted in FIG. 3A depicts a first creation context for the new collaboration document. This creation context may be associated with the set of all users participating in the synchronous multimedia collaboration session. In such a scenario, the associated users (i.e., those users participating in the synchronous multimedia collaboration session) are then granted appropriate permissions based on the creation context.

Figure 3B:
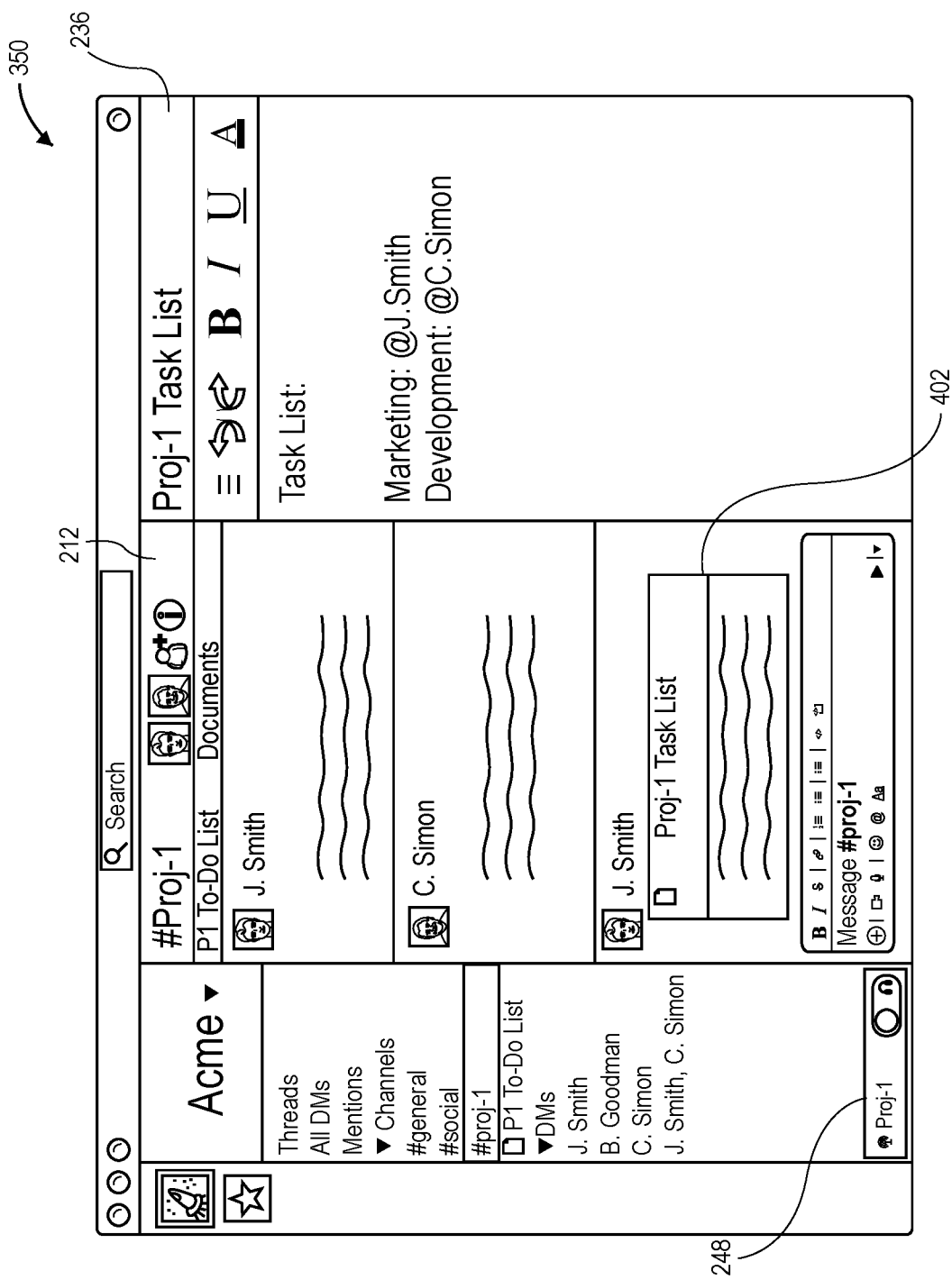
FIG. 3B depicts a user interface for a channel after the synchronous multimedia collaboration session.

FIG. 3B depicts a second context where the synchronous multimedia communication session has ended and the collaborative document is persisted in the channel (the second virtual space). Thus, the second context for the collaboration document is the channel in which the collaborative document is persisted. This second context may be associated with the set of all users in the channel, and the associated users (i.e., the channel members) are then granted appropriate permissions based on the second context. FIG. 3B illustrates user interface 350 showing the channel after the synchronous multimedia collaboration session has ended, and document pane 236 now reflects the changes made to the collaborative document, including the mentioning of users to assign those users to tasks. In some embodiments, although some information (such as voice and/or video data) from synchronous multimedia collaboration sessions is ephemeral, collaborative documents are automatically persisted in the associated channel or other virtual space. As described below, the end of a synchronous multimedia collaboration session and/or persisting the collaborative document into an additional virtual space may result in another context being identified, causing the permissions for the shared document to be updated accordingly. As depicted, one or more users have collaborated within the collaborative document and added content, mentioning specific users and tasks. As discussed below, mentioning specific users within a collaborative document may also cause a new sharing context to be identified, granting those users permissions to view and/or edit the document if they did not already have those permissions. Shared collaborative document 402 now includes a preview of the collaborative document showing the updated content and persists despite the synchronous multimedia collaboration session having ended.

Broadly speaking, embodiments of the invention contemplate a variety of events that may trigger a change of context or an additional context for the collaborative document. As a first example, the scenario discussed above with respect to FIGS. 3A and 3B is one example of such an event, where the termination of the synchronous multimedia collaboration session results in a new context where the collaborative document is persisted into a channel. In such a scenario, the permissions associated with the first (creation) context (i.e., the permissions for the set of users participating in the synchronous multimedia collaboration session) may be different from the permissions associated with the new (persistence) context (i.e., the channel members). For example, the users who participated in the synchronous multimedia collaboration session may have read/write permissions to the collaborative document, while the channel members may have read-only permissions.

As a second example of an event that may trigger a change of context or an additional context for the collaborative document, a user without permissions to access the document may be mentioned (by, for example, prefixing their username with a special symbol such as "@") in the collaborative document or in a message where the collaborative document is also mentioned. Such a scenario may result in a new (mention) context for the collaborative document, thereby causing the mentioned user to be granted certain permissions associated with the document. The types of permissions granted to the mentioned user may depend on the details of the mention. For example, mentioning in a message where the collaborative document is also mentioned may grant the mentioned user read-only permissions, while @mentioning the user in a "To-Do" section of the collaborative document may grant the mentioned user read/write permissions for the collaborative document.

As a third example of an event that may trigger a change of context or an additional context for the collaborative document, a user may reply with a comment in the group-based communication system message thread where the collaborative document was posted. Such a scenario may result in a new (comment) context for the collaborative document, thereby causing the mentioned user to be granted certain permissions associated with the collaborative document. For example, the commenting user may have read-only permissions associated with the collaborative document by virtue of their channel membership, as described above. The new (comment) context may cause that user to also be granted permission to comment within (but not necessarily edit) the collaborative document.

As a fourth example of an event that may trigger a change of context or an additional context for the collaborative document, a user may mention the document in a new virtual space (such as a channel, direct-message, multi-person direct message, or synchronous multimedia collaboration session). Such a scenario may result in a new (reference) context for the collaborative document, causing users associated with the new (reference) context to be granted certain permissions for the associated document. For example, members of the channel in which the document was mentioned may be granted read-only permissions to the collaborative document, similar to the users in the channel when the persistence context was created or added. Alternatively, members of the channel in which the document was mentioned may be granted read-write permissions to the document, or only certain channel members may be granted read-write access, depending on the message in which the collaborative document was mentioned.

As a fifth example of an event that may trigger a change of context or an additional context for the collaborative document, a user without appropriate permissions may attempt to unfurl or otherwise preview the collaborative document. Such a scenario may result in a new (preview) context for the collaborative document, causing the user associated with the new (preview) context to be granted certain permissions for the associated document. For example, if another user provides the previewing user with a link to the collaborative document, a preview may be generated for the link. When the previewing user views the preview (or attempts to unfurl the preview), the new (preview) context may be created, and the previewing user may be granted permissions to preview the collaborative document. In embodiments where preview permission is not a separate permission type, the previewing user may be granted read-only permission (or any other permission) instead.

Figure 4:
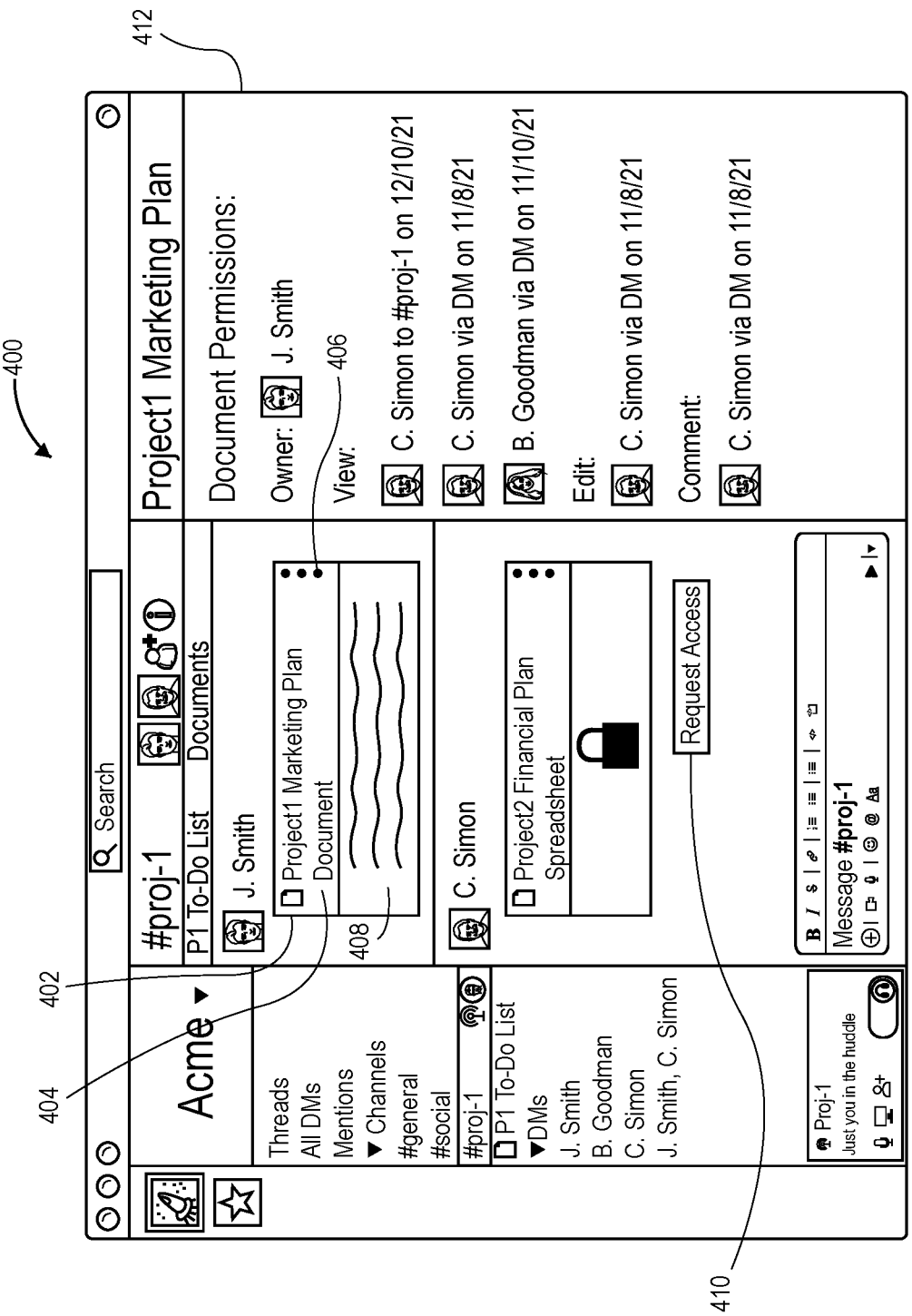
FIG. 4 depicts a user interface for the group-based communication system for certain embodiments.

FIG. 4 depicts user interface 400 for the group-based communication system as applied for certain embodiments. A channel pane is depicted containing shared collaborative document 402. In some embodiments, shared collaborative document 402 may be shared within a virtual space. For example, a user may share a collaborative document within a channel by posting a message in the channel with the collaborative document attached. In some embodiments, shared collaborative document 402 may be displayed alongside other content, such as messages, posted within the channel. Shared collaborative document 402 may include shared collaborative document header 404, shared collaborative document menu 406, and shared collaborative document preview 408. Continuing the example above, interface 400 might depict the channel in which the user has shared collaborative document 402 as the preview is presented to another member of the channel. In some embodiments, the preview may be presented in a furled form such that only a document title is displayed, and the channel member may unfurl the collaborative document using a provided control (not shown) to display the preview. As described above, the user viewing (or attempting) to view or unfurl the preview may result in a new (preview) context for the collaborative document, and as a result, the viewing user may be granted an appropriate set of permissions for the collaborative document. For example, in some embodiments, there may be a separate permission for previewing a collaborative document and users without the appropriate permissions to unfurl shared collaborative document 402 may not see any information about shared collaborative document 402 until or unless they are granted the appropriate permission. For example, a user without permission may see only a message indicating that the user does not have access to the collaborative document. Alternatively, or in addition, users may have permissions access only to certain sections of the document, which may be reflected in the preview. Still further, a special preview permission may be present in some embodiments, allowing a user to access (or unfurl) a preview of the document without being able to view or edit the full document. In embodiments where a such a new (preview) context for the collaborative document does not result in granting the user permission to view the full collaborative document, a user without view permission for the document may request permission from the posting user using an affordance such as request access button 410.

Shared collaborative document header 404 may include information about shared collaborative document 402. For example, shared collaborative document header 404 may include the name of the collaborative document, such as Project1 Marketing Plan. In some embodiments, shared collaborative document header 404 may also include the type of collaborative document such as a text file, spreadsheet, presentation, image, video, or any other file type. Shared collaborative document header 404 may also include information on who the owner of the collaborative document is. In some embodiments, the collaborative document information may be displayed directly. In further embodiments, some or all of the collaborative document information may be included as a tooltip which will appear when a user hovers over shared collaborative document header 404.

Shared collaborative document menu 406 permits a user to access options related to shared collaborative document 402. Shared collaborative document menu 406 may allow the user to open the collaborative document, print the collaborative document, or share the collaborative document. In some embodiments, shared collaborative document menu 406 may provide the user with access to additional information about shared collaborative document 402. In further embodiments, selecting the additional information for shared collaborative document 402 may include opening collaborative document information pane 412.

Shared collaborative document preview 408 may provide the user with a preview of shared collaborative document 402. For example, if the collaborative document is a text-based collaborative document, a sample of the text at the beginning of the collaborative document may be displayed as a preview. The preview of shared collaborative document 402 may vary for different users. For example, a user may only have permission to view certain sections of the collaborative document, and therefore only portions which the user is able to view may appear as a preview. In some embodiments, selecting shared collaborative document preview 408 may launch a viewer in which a user is able to fully view and interact with the collaborative document. In further embodiments, selecting shared collaborative document preview 408 may launch the collaborative document as a new pane, as seen at FIG. 2B. In still further embodiments, the user may elect to pop out the collaborative document in a separate window entirely. Shared collaborative document preview 408 may only provide a preview of shared collaborative document 402 if the viewing user has the appropriate permissions to view shared collaborative document 402. In some embodiments, shared collaborative document preview 408 may only provide a preview if the viewing user has preview permissions, which may be separate from the full view permissions. If the viewing user does not have appropriate permissions, shared collaborative document preview 408 may not display a preview but instead display an indication to the user that the user does not have the appropriate permissions to preview the collaborative document.

In some embodiments, shared collaborative document 402 may include request access button 410. If a user does not have access to shared collaborative document 402, request access button 410 may be selected to send a permissions request. In some embodiments, after request access button 410 is selected the owner of shared collaborative document 402 may receive a notification that a user is requesting access. The access request may default to a request for permission to view the collaborative document. In some embodiments, request access button 410 may permit a user to specify which permissions the user is requesting. For example, a user may select that they want permission to edit a collaborative document.

In some embodiments, collaborative document information pane 412 may provide additional information about shared collaborative document 402. Collaborative document information pane 412 may include a manifest of all the users who have permissions to the shared collaborative document 402, including information about when those permissions were granted. In some embodiments, collaborative document information pane 412 may include information on every message which assigned some permission to shared collaborative document 402. For example, collaborative document information pane 412 may display a list of all users who have permission to view shared collaborative document 402 including when each user was granted access and how the user was granted access, such as through a direct message or via the collaborative document being shared to a channel. In some embodiments, collaborative document information pane 412 will permit a user to select a message to view the full context of the permission grant. In some embodiments, users may only have permission to see some information about the messages. For example, a user may not be able to see the full message content for a direct message between two other users. In some embodiments, the full shared collaborative document information may only be visible to the owner of the collaborative document. In further embodiments, collaborative document information pane 412 may retain a permissions history for shared collaborative document 402 even after permissions have been changed. For example, the permissions history may indicate that C. Simon was previously able to access a collaborative document but because the message granting him permission to view the collaborative document was deleted he no longer has access. In some embodiments, collaborative document information pane 412 may provide a summary of permissions for shared collaborative document 402. For example, collaborative document information pane 412 may display that a specific number of users have viewing permissions for a particular collaborative document.

Figure 5:
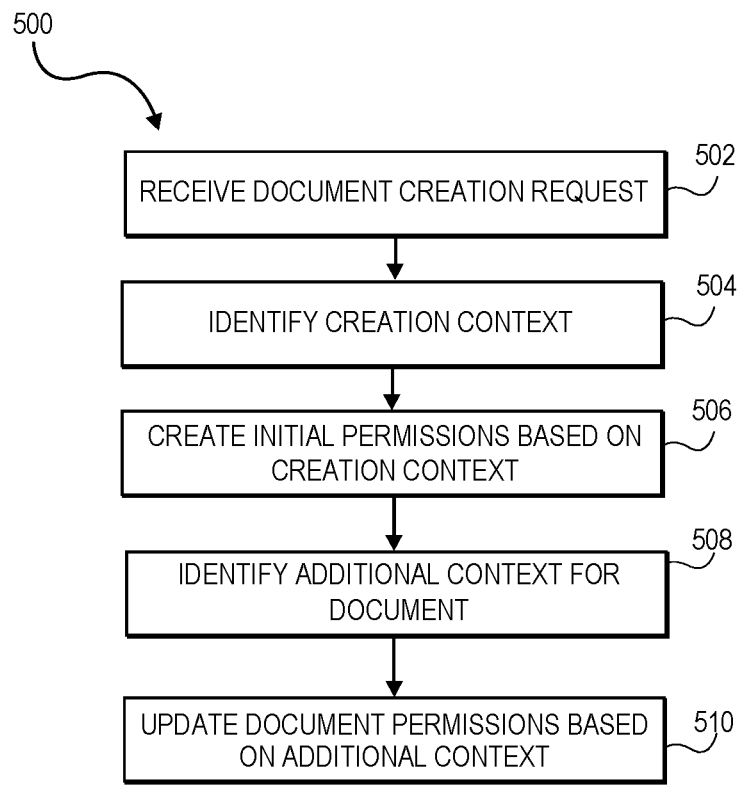
FIG. 5 depicts a flowchart relating to some embodiments of the invention.

FIG. 5 depicts flowchart 500 relating to some embodiments of the invention. At a high level, embodiments of the invention automatically update access permissions for a document based on the context (or contexts) in which the document is created, referenced, used, or accessed. As used herein, a context is associated with a particular set of users who should be able to access a particular collaborative document based on a particular event, such as the creation, reference, use or access of the document. For example, a context may be associated with a set of users present in a virtual space in which a document is created, mentioned, or shared. Permissions may be updated as a document transitions between virtual spaces. A document may have permissions based on multiple contexts, and permissions based on later-identified contexts may overwrite or supplement the permissions based on earlier contexts.

At step 502, a collaborative document creation request is received. The collaborative document creation request may be submitted by a user of a group-based communication system. In some embodiments, the collaborative document creation request may occur as a result of a workflow. In other embodiments, the collaborative document may be manually created by a user. In still other embodiments, the collaborative document may be imported from an external source. For example, a text-based document may be uploaded to the group-based communication system and converted into a collaborative document. The collaborative document creation request may correspond to a first context associated with users in a virtual space, such as a channel, a workspace, a synchronous multimedia collaboration session, another collaborative document, a direct message, or a multi-person direct message. As described below with respect to step 506, this first (creation) context determines the first set of permissions associated with the collaborative document. For example, a user may be in a synchronous multimedia collaboration session and decide to start a new collaborative document to take notes during the session, and all of the users in the synchronous multimedia collaboration session may be granted read/write permissions to the new collaborative document. As another example, a user may wish to create a collaborative document for a project channel to compile a list of action items for the project, and members of the project channel may be granted the appropriate permissions for the action items collaborative document because the members are associated with the channel context. In some embodiments, a change in the context of a collaborative document may occur when the collaborative document existing outside of the group-based communication system is added, uploaded, or linked to in the group-based communication system.

At step 504, an initial creation context is identified based on the context in which the collaborative document was created. As a first example, if two users are participating in a synchronous multimedia collaboration session (as depicted in FIG. 3A), and one of the users created a collaborative document to memorialize the discussion, the creation context for the collaborative document might include the two users participating in the synchronous multimedia collaboration session when the collaborative document is created. Alternatively, one or more administrators associated with the virtual space in which the collaborative document was created may be included in the context as well. As a second example, if the collaborative document is created based on an importation of an original document from an external application, then the creation context for the collaboration document might include the set of users who had access to the original document plus the importing user. As a third example, if the collaborative document is created by a workflow, then the workflow might manually specify the set of users to be included in the creation context. As a fourth example, in some embodiments, a new collaborative document may be created if a non-existent document is referenced in the group-based communication system. In such a case, the creation context might include the mentioning user and any other users mentioned in the message that caused the new collaborative document to be created. Alternatively, or in addition, the creation context might include all members of the virtual space (such as a channel, direct message, multi-person direct message, synchronous multimedia collaboration session, or thread) where the message was sent.

Next, at step 506, an initial set of document permissions is determined based on the creation context. In some embodiments, a user who created the collaborative document may be assigned as the owner of the collaborative document. In some embodiments, when the collaborative document is created within a virtual space, and permissions may be determined based on participation in that virtual space. For example, if a collaborative document is created from within a synchronous multimedia collaboration session which was started from within a channel, then the permissions may be assigned such that only the participants in the synchronous multimedia collaboration session have a full set of access permissions to the collaborative document. Further, in some embodiments, other members of the channel in which the synchronous multimedia collaboration session was started may also have some or all permissions to access the document. For example, the participants in the synchronous multimedia collaboration session may have read and edit permissions for the collaborative document, while other, non-participating channel members may have read-only permissions.

In some embodiments, permissions may be determined based on a type of the virtual space, a size of the corresponding set of users associated with the virtual space, and a history of communication with the corresponding set of users associated with the virtual space. For example, a collaborative document created in a direct message between two users or a small channel with few members may automatically grant full permissions to all users in the virtual space, whereas a collaborative document created within a large channel may not automatically grant permissions to all users within the channel but instead grant read and edit permission to the creator, read-only permissions to channel members mentioned in a message that also mentions the document and preview-only permissions to the remaining channel members. Alternatively, in some embodiments, the collaborative document created from a channel grants permissions to all users who are members of the channel, regardless of the membership size of the channel. In some embodiments, such threshold sizes may apply only to certain types of virtual space. For example, if the virtual space is a synchronous multimedia collaboration session with many users, then permissions may be granted even though the virtual space is large.

In some embodiments, permissions may be specified individually for particular sections within a collaborative document. For example, a collaborative document may include a finance section which only a select subset of users is able to view. As another example, a collaborative document may include a legal risks section which only users with a legal role in the organization may edit. In some embodiments, the initial permissions for collaborative documents are determined on a channel or organization level, regardless of the context. For example, a small organization may wish for all collaborative documents to automatically set the permissions such that every user of the organization can access every collaborative document.

Broadly, permissions for a collaborative document may comprise a list of permission assignments, wherein each permission assignment may comprise information on the permission assignment creation, an entity that the permission assignment applies to, and one or more actions which the entity is permitted to take. Information on the permission assignment creation may include which entity granted the permission assignment, when the permission assignment was granted, and how the permission assignment was granted. For example, a permission assignment may indicate that C. Simon was automatically granted permission to access a collaborative document containing notes from a synchronous multimedia collaboration session when J. Smith sent a direct message containing the collaborative document to C. Simon on Dec. 10, 2021, at 7:42 PM.

An entity which receives the permission may be, for example, a user or group of users within the group-based communication system, a virtual space (for example, a multimedia collaboration session) within the group-based communication system, or a workflow. Actions which the entity may be permitted to take may include viewing, previewing, editing, commenting in, replying to comments in, sharing, deleting, copying, formatting, or assigning permissions for the collaborative document.

Next, at step 508, an additional context is identified for the collaborative document. Such an identification may take place immediately after collaborative document creation or at any point afterwards. In some embodiments, an additional context is identified when the collaborative document is used, accessed, referenced, or mentioned in a virtual space that is different from a virtual space in which the collaborative document was created. For example, if a collaborative document is created during a synchronous multimedia collaboration session, the collaborative document may be persisted in a channel (or other virtual space) either manually by one of the participating users or automatically as the result of the end of the synchronous multimedia collaboration session. In such a scenario, the new context may be identified based on the new channel (or other new virtual space). For example, where the collaborative document is created within a synchronous multimedia collaboration session which was in turn started from within a multi-person direct message, then the creation context might include only the participants in the multi-person direct message while the additional context might include the other members of the multi-person direct message group. This additional context might be identified when the collaborative document is created or when the synchronous multimedia collaboration session ends.

In some embodiments, an additional context may be identified as a result of a user sharing the collaborative document. For example, if a user is mentioned (for example, by prefixing their username with a special character such as an "@" symbol) within the document, this may lead to an additional sharing context being identified that includes the mentioned user. Alternatively, or in addition, an additional sharing context might be identified based on the document and the user being mentioned in the same group-based communication system message, thread, or channel. In some embodiments, only such mentions by users with appropriate permissions lead to the identification of an additional context. For example, if a given user does not have read permissions for a particular collaborative document, then a message sent by the given user that mentions the collaborative document and another user may not lead to an additional context being identified for the document. Similarly, if the ability to share or manage permissions for a document is a distinct permission, then mentions of other users with or in the collaborative document may not lead to an additional context being identified for the document.

Collaborative documents may also be shared from within other collaborative documents. For example, a user may mention a vacation policy document from within an onboarding document to automatically grant any user with access to the onboarding document to view the vacation policy document. In some embodiments, users may share collaborative documents directly from within a collaborative document by mentioning a user of the group-based communication system. For example, a user may tag a marketing user from the marketing team from within a project proposal document to automatically share the project proposal document with the marketing user. As another example, a manager may mention people on a task list as a way of assigning the tasks to those users.

In some embodiments, a collaborative document may be added to multiple virtual spaces concurrently or sequentially. For example, the collaborative document may be added to any virtual space in which it is mentioned, linked, referenced, or accessed.

In other embodiments, collaborative documents may be moved from one virtual space to another. In such embodiments, moving a collaborative document from one virtual space may lead to the identification of another context for the document. and may be treated as adding the document to the second virtual space and deleting the collaborative document from the first virtual space, as discussed below.

In some embodiments a collaborative document may be deleted from a virtual space. In some embodiments, deleting the collaborative document from a virtual space may remove all permissions to the collaborative document, including deleting the document from any other virtual location in which it was shared. For example, if a collaborative document was created in a first channel but later shared to a second channel, deleting the collaborative document from the first channel may automatically delete the collaborative document from the second channel. In some such embodiments, only deleting the collaborative document from the virtual space in which it was created causes the document to be removed from all virtual spaces. In other embodiments, deleting a collaborative document from a particular virtual space identifies a current or past context associated with that virtual space and causes permissions to be deleted based on that context rather than added based on that context, while leaving in place permissions based on other contexts for the collaborative document.

Next, at step 510, an updated set of document permissions is determined based on the additional context. In some embodiments, permissions based on the additional context supplement the permissions based on the creation context. In some embodiments, permissions associated with the additional context replace the permissions determined based on the creation context, such that all permissions not associated with the new context are removed. In some embodiments, as described below, users can manage permissions by manually granting particular permissions to particular users. In some such embodiments, manually assigned permissions are not removed when permissions associated with the additional context replace the permissions determined based on the creation context.

In some embodiments, permissions may only be modified by the owner of a document. In further embodiments, any user with permissions may be able to modify some subset of permissions. For example, in some embodiments any user with permissions to access a collaborative document may be able to share the collaborative document to provide other users with access. Different access permissions may also be managed differently. For example, any user may be able to share a collaborative document to grant viewing access, but only the owner of the collaborative document may be able to provide other users with edit access. In some embodiments, manual permission assignments may correspond to a (visible or hidden) message within the group-based communication system. For example, a first user may send a direct message to a second user and include a collaborative document, either by mentioning the collaborative document such as "@CollaborativeDocument" or by providing a link to the collaborative document. This message then may automatically modify the permissions for the second user to grant the second user access to the collaborative document. In some such embodiments, where permissions are based on messages within the group-based communication system, the user associated with the message (for example the message author) may be able to revoke the associated permission by deleting the message. In further embodiments, hidden messages may be sent to virtual spaces to associate collaborative documents with the virtual spaces before the collaborative document is visibly shared.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. One or more non-transitory computer-readable media storing computer-executable instructions that, when executed by at least one processor, perform a method for managing permissions for a collaborative document within a group-based communication system comprising:

receiving a request to create the collaborative document associated with a first user of a first virtual space in the group-based communication system, receiving a creation context associated with the first virtual space, the first virtual space having a corresponding first set of users including the first user;

based on the creation context, creating the collaborative document, including creating a set of collaborative document permissions for the corresponding first set of users associated with the first virtual space;

determining an update context distinct from the creation context based on an event associated with a sharing, by at least one user of the corresponding first set of users, and causing display of at least a portion of the collaborative document in a second virtual space distinct from the first virtual space, the second virtual space being associated with the update context, wherein the update context is associated with a corresponding second set of users associated with the second virtual space who can access the collaborative document from the second virtual space;

responsive to detecting the sharing, automatically updating the set of collaborative document permissions based on the update context for the corresponding second set of users associated with the second virtual space;

determining that a user associated with the group-based communication system is mentioned in association with the collaborative document by the user being mentioned in a communication associated with the collaborative document or the user being mentioned within the collaborative document; and in response to determining that the user is mentioned in association with the collaborative document, sending a notification to the user and granting permission to the user to access the collaborative document, wherein:

the group-based communication system maintains a document information pane associated with the collaborative document that depicts:

an identity of users that currently have permission to access the collaborative document;

historical changes to permissions associated with the collaborative document;

a time in which each of the users was granted the permissions to the collaborative document; and a manner in which the users were granted the permissions to the collaborative document; and the set of collaborative document permissions is based on a type of the first virtual space, a size or number of the corresponding first set of users, and a history of communications between the corresponding first set of users.

2. The one or more non-transitory computer-readable media of claim 1, wherein the sharing and causing display of the at least the portion of the collaborative document comprises receiving a message request to send a message in the second virtual space of the group-based communication system, wherein the message contains a first mention of the collaborative document and a second mention of a second user, wherein the second user is not in the corresponding second set of users with permission to access the collaborative document, and in response to receiving the first mention and the second mention, updating the set of collaborative document permissions to add the second user to the corresponding second set of users.

3. The one or more non-transitory computer-readable media of claim 1, the method further comprising:

receiving a mention request to associate a second user with the collaborative document, wherein the second user is not in the corresponding second set of users with permission to access the collaborative document, and in response to receiving the mention request, updating the set of collaborative document permissions to add the second user to the corresponding second set of users.

4. The one or more non-transitory computer-readable media of claim 1, the method further comprising:

receiving a comment to the collaborative document from a second user in a message in the second virtual space, wherein the second user is not in the corresponding second set of users with permission to access the collaborative document, and in response to receiving the comment in the second virtual space, updating the set of collaborative document permissions to add the second user to the corresponding second set of users.

5. A method for managing permissions for a collaborative document within a group-based communication system, the method comprising:

receiving a request to create the collaborative document associated with a first user of a first virtual space in the group-based communication system, receiving a creation context is associated with the first virtual space, the first virtual space having a corresponding first set of users including the first user;

based on the creation context, creating the collaborative document, including creating a set of collaborative document permissions for the corresponding first set of users associated with the first virtual space;

determining an update context distinct from the creation context based on a sharing of, and causing display of, at least a portion of the collaborative document by at least one user of the corresponding first set of users in a second virtual space distinct from the first virtual space, the second virtual space being associated with the update context, wherein the update context is associated with a corresponding second set of users associated with the second virtual space who can access the collaborative document from the second virtual space;

responsive to detecting the sharing, automatically updating the set of collaborative document permissions based on the update context for the corresponding second set of users associated with the second virtual space;

determining that a user associated with the group-based communication system is mentioned in association with the collaborative document by the user being mentioned in a communication associated with the collaborative document or the user being mentioned within the collaborative document; and in response to determining that the user is mentioned in association with the collaborative document, sending a notification to the user and granting permission to the user to access the collaborative document, wherein:

the group-based communication system maintains a document information pane associated with the collaborative document that depicts:

an identity of users that currently have permission to access the collaborative document;

historical changes to permissions associated with the collaborative document;

a time in which each of the users was granted the permissions to the collaborative document; and a manner in which the users were granted the permissions to the collaborative document; and the set of collaborative document permissions is based on a type of the first virtual space, a size or number of the corresponding first set of users, and a history of communications between the corresponding first set of users.

6. The method of claim 5, wherein the sharing and causing display of the at least the portion of the collaborative document comprises receiving a message request to send a message in the second virtual space of the group-based communication system, wherein the message contains a first mention of the collaborative document and a second mention of a second user, wherein the second user is not in the corresponding second set of users with permission to access the collaborative document, and in response to receiving the first mention and the second mention, updating the set of collaborative document permissions to add the second user to the corresponding second set of users.

7. The method of claim 5, further comprising:

receiving a mention request to associate a second user with the collaborative document, wherein the second user is not in the corresponding second set of users with permission to access the collaborative document, and in response to receiving the mention request, updating the set of collaborative document permissions to add the second user to the corresponding second set of users.

8. The method of claim 5, further comprising:

receiving a comment to the collaborative document from a second user in a message in the second virtual space, wherein the second user is not in the corresponding second set of users with permission to access the collaborative document, and in response to receiving the comment in the second virtual space, updating the set of collaborative document permissions to add the second user to the corresponding second set of users.

9. A system comprising at least one processor and at least one non-transitory memory storing computer executable instructions that when executed by the at least one processor cause the system to carry out actions for managing permissions for a collaborative document within a group-based communication system comprising:

receiving a request to create the collaborative document associated with a first user of a first virtual space in the group-based communication system, receiving a creation context is associated with the first virtual space, the first virtual space having a corresponding first set of users including the first user;

based on the creation context, creating the collaborative document, including creating a set of collaborative document permissions for the corresponding first set of users associated with the first virtual space;

determining an update context distinct from the creation context based on a sharing of, and causing display of, at least a portion of the collaborative document by at least one user of the corresponding first set of users in a second virtual space distinct from the first virtual space, the second virtual space being associated with the update context, wherein the update context is associated with a corresponding second set of users associated with the second virtual space who can access the collaborative document from the second virtual space;

responsive to detecting the sharing, automatically updating the set of collaborative document permissions based on the update context for the corresponding second set of users associated with the second virtual space;

determining that a user associated with the group-based communication system is mentioned in association with the collaborative document by the user being mentioned in a communication associated with the collaborative document or the user being mentioned within the collaborative document; and in response to determining that the user is mentioned in association with the collaborative document, sending a notification to the user and granting permission to the user to access the collaborative document, wherein:

the group-based communication system maintains a document information pane associated with the collaborative document that depicts:

an identity of users that currently have permission to access the collaborative document;

historical changes to permissions associated with the collaborative document;

a time in which each of the users was granted the permissions to the collaborative document; and a manner in which the users were granted the permissions to the collaborative document; and the set of collaborative document permissions is based on a type of the first virtual space, a size or number of the corresponding first set of users, and a history of communications between the corresponding first set of users.

10. The system of claim 9, wherein the sharing and causing display of the at least the portion of the collaborative document comprises receiving a message request to send a message in the second virtual space of the group-based communication system, wherein the message contains a first mention of the collaborative document and a second mention of a second user, wherein the second user is not in the corresponding second set of users with permission to access the collaborative document, and in response to receiving the first mention and the second mention, updating the set of collaborative document permissions to add the second user to the corresponding second set of users.

11. The system of claim 9, further comprising:
receiving a mention request to associate a second user with the collaborative document, wherein the second user is not in the corresponding second set of users with permission to access the collaborative document, and in response to receiving the mention request, updating the set of collaborative document permissions to add the second user to the corresponding second set of users.

12. The non-transitory computer-readable media of claim 1, wherein an extent to which the user is authorized to access, read, and modify the collaborative document is based on a type of mention with respect to the user and the collaborative document.

13. The non-transitory computer-readable media of claim 1, the method further comprising:
determining that the a channel of the group-based communication system is mentioned in association with the collaborative document by the channel being mentioned in a communication associated with the collaborative document or the channel being mentioned within the collaborative document; and in response to determining that the channel is mentioned in association with the collaborative document:
updating permissions associated with the channel; and
granting access to the collaborative document to members of the channel.

14. The non-transitory computer-readable media of claim 1, the method further comprising associating a workflow with the collaborative document by including an identity of the workflow within the collaborative document or identifying the workflow in a communication associated with the collaborative document, wherein, when executed, the workflow initiates an approval process to approve modifications to the collaborative document.

15. The non-transitory computer-readable media of claim 1, wherein:
a first section of the collaborative document is associated with a first permission with respect to first access to the first section of the collaborative document; and a second section of the collaborative document, different than the first section, is associated with a second permission, different than the first permission, with respect to second access, different than the first access, to the second section of the collaborative document.

16. The non-transitory computer-readable media of claim 1, the method further comprising:
determining that one or more users associated with the group-based communication system are mentioned in a thread of a message that posted the collaborative document or referenced the collaborative document; and in response to determining that the one or more users are mentioned in the thread, updating permissions of the one or more users with respect to the collaborative document.

17. The non-transitory computer-readable media of claim 1, wherein a permission associated with the collaborative document allows one or more users to preview the collaborative document, without the one or more users being able to view an entirety of the collaborative document and without the one or more users being able to modify the collaborative document.

18. The non-transitory computer-readable media of claim 1, the method further comprising:
determining that the collaborative document has been deleted from the first virtual space; and in response to determining that the collaborative document has been deleted from the first virtual space, removing permissions associated with the collaborative document with respect to virtual spaces, including the second virtual space, in which the collaborative document was previously shared.

19. The method of claim 5, wherein an extent to which the user is authorized to access, read, and modify the collaborative document is based on a type of mention with respect to the user and the collaborative document.

20. The method of claim 5, wherein:
a first section of the collaborative document is associated with a first permission with respect to first access to the first section of the collaborative document; and a second section of the collaborative document, different than the first section, is associated with a second permission, different than the first permission, with respect to second access, different than the first access, to the second section of the collaborative document.

* * * * *